United States Patent [19]

Kamiyama

[11] Patent Number: 4,493,779

[45] Date of Patent: Jan. 15, 1985

[54] PROCESS FOR THE PREPARATION OF FERRITE MAGNETIC PARTICULATE FOR MAGNETIC RECORDING

[75] Inventor: Kouzi Kamiyama, Kanagawa, Japan

[73] Assignee: Fuji Photo Film Co., Ltd., Kanagawa, Japan

[21] Appl. No.: 580,162

[22] Filed: Feb. 14, 1984

[30] Foreign Application Priority Data

Feb. 16, 1983 [JP] Japan ................... 58-24254

[51] Int. Cl.³ .............................................. C04B 35/26
[52] U.S. Cl. .............................. 252/62.59; 252/62.56; 252/62.62; 252/62.63; 423/594
[58] Field of Search ............... 252/62.56, 62.58, 62.59, 252/62.62, 62.63; 423/594

[56] References Cited

U.S. PATENT DOCUMENTS

| | | | |
|---|---|---|---|
| 4,124,735 | 11/1978 | O'Horo | 252/62.59 X |
| 4,140,645 | 2/1979 | Beall et al. | 252/62.59 X |
| 4,233,169 | 11/1980 | Beall et al. | 252/62.59 |
| 4,341,648 | 7/1982 | Kubo et al. | 252/62.59 X |
| 4,407,721 | 10/1983 | Koike et al. | 252/62.59 |

FOREIGN PATENT DOCUMENTS 56-90505 7/1981 Japan ................... 252/62.59

*Primary Examiner*—Jack Cooper
*Attorney, Agent, or Firm*—Murray, Whisenhunt and Ferguson

[57] ABSTRACT

A process for the preparation of a ferrite magnetic particulate for magnetic recording which comprises steps of: (1) melting a starting material mixture containing a basic component for hexagonal ferrite, a coercive force-reducing component and a glass-forming component; (2) rapidly cooling the resulting molten mixture to obtain an amorphous material; (3) heat-treating said amorphous material to form ferrite crystals; and (4) removing components other than the ferrite crystals from the material resulting from said heat-treatment:

characterized in that said starting material mixture contains a glass-forming component comprising a $B_2O_3$ component and a $SiO_2$ component in which the amount of said $SiO_2$ component has a value (in terms of $SiO_2$) 0.05 to 0.8, the value being represented by a molar ratio of $SiO_2/(B_2O_3+SiO_2)$.

3 Claims, No Drawings

PROCESS FOR THE PREPARATION OF FERRITE MAGNETIC PARTICULATE FOR MAGNETIC RECORDING

BACKGROUND OF THE INVENTION

1. Field of the Invention

The present invention relates to a process for the preparation of ferrite magnetic particulate for magnetic reocrding, and more particularly relates to a finely divided ferrite magnetic material, which is suitable for use in perpendicular magnetic recording system.

2. Description of Prior Arts

Heretofore, there has been used a magnetic recording system wherein a recording medium such as magnetic recording tape is magnetized along its longitudinal direction in the surface area thereof. A perpendicular magnetic recording system has been recently proposed for accomplishing high density magnetic recording, and various magnetic mediums for use in this system are under study.

There are known methods wherein a magnetic material layer is formed on a substrate (i.e., support) such as a film by a sputtering process, a vacuum deposition process, etc. as the method of preparing the magnetic recording medium for use in the perpendicular magnetic recording system. For example, there has been developed a magnetic recording medium wherein a layer of a magnetic material such as cobalt-chromium is formed on a substrate by the sputtering process.

However, the process for preparing the magnetic recording medium utilizing said sputtering process or vacuum deposition process has disadvantages in productivity and product quality as compared with conventional process for preparing the magnetic recording medium utilizing the conventional coating process. Accordingly, methods utilizing the coating process are also studied as the process for preparing the magnetic recording medium for use in the perpendicular magnetic recording system.

For example, there has been proposed a process for preparing the magnetic recording medium for use in the perpendicular magnetic recording system wherein a hexagonal ferrite such as hexagonal barium ferrite in the form of fine particles having a hexagonal plate shape is used as a magnetic material, the hexagonal ferrite is mixed with and dispersed in a resin (binder) and the surface of a support is coated with the ferrite.

As typical processes for preparing the hexagonal ferrite such as hexagonal barium ferrite used as the magnetic particulate for the above-mentioned magnetic recording medium, there are known wet processes (such as co-precipitation process and hydrothermal synthetic process), vitrification process, etc.

The present invention provides an improved process for the preparation of hexagonal ferrite magnetic particulate by the vitrification process.

The preparation of the hexagonal ferrite magnetic material by the vitrification process is generally carried out in the following manner. A mixture of starting materials containing the desired ferrite component and a glass-forming component is melted and then rapidly cooled to form an amorphous material which is then heat-treated as such to form and deposit hexagonal ferrite crystals therefrom, and other materials such as glass component, etc. than the ferrite crystals are removed from the material obtained from the above heat treatment (hereinafter referred to as heat-treated material).

The starting material mixture for used in the preparation of the hexagonal ferrite magnetic material by the vitrification process usually contains a basic component for the hexagonal ferrite, a coercive force-reducing component and a glass-forming component.

As the basic component for the hexagonal ferrite, $Fe_2O_3$ in combination with a metal oxide or oxides such as BaO, SrO and PbO is used. As the coercive force-reducing component, a combination of a divalent metal oxide or oxides such as CoO, NiO and ZnO with a tetravelent metal oxide or oxides such as $TiO_2$, $ZrO_2$ and $HfO_2$ is used. As the glass-forming component, boron oxide ($B_2O_3$) is generally used. Alternatively, there may be incorporated in the starting material mixture the above-mentioned components in the form of compounds or salts (for example, carbonate, nitrate and boric acid for boron) capable of being converted into the above-mentioned oxides under heating conditions in the melting step of the starting material mixture.

The ferrite prepared from the above-mentioned starting material mixture is a magnetoplumbite type hexagonal ferrite having the following formula:

$$RFe_{12-2x}M_xM'_xO_{19}$$

wherein R is at least one metal atom selected from the group consisting of barium, strontium and lead, M is at least one divalent metal atom selected from the group consisting of cobalt, nickel and zinc, M' is at least one tetravalent metal atom selected form the group consisting of titanium, zirconium and hafnium, and x is a number ranging from 0.6 to 1.0.

The ferrite magnetic material in the shape of hexagonal plate, which is suitable for use in the perpendicular magnetic recording system, is in the form of fine particles wherein the diameter of the hexagonal plate is 0.1 $\mu$m or below and the thickness thereof is 0.03 $\mu$m or below. In order to prepare such magnetic material in the form of fine particles, there is used in the conventional vitrification process, for example, a process wherein the molten starting material mixture containing the above-mentioned components is quenched to convert it into an amorphous material which is subsequently heat-treated to form the deposit hexagonal ferrite crystals. As the method of quenching the molten mixture, there is used a method wherein the molten starting material mixture is brought into contact with the surface of rotating metallic rolls by pouring the molten mixture onto said surface (called roll method).

As described hereinbefore, the magnetic recording medium for use in the perpendicular magnetic recording system utilizing hexagonal ferrite magnetic particulate is produced by forming on a substrate a magnetic particulate-containing layer in which said magnetic particulate is dispersed in a binder. It is desirable for the magnetic recording medium that the noise possibly generated therein in the course of the magnetic recording stage and regenerative output stage is suppressed. The intensity of noise generation in the magnetic recording medium is related to the size of ferrite magnetic particulate used therein. In general, the smaller the size of the magnetic particulate used therein becomes, the lower the noise of the magnetic recording medium generated during the magnetic recording or regenerative output stage becomes. This fact is valid for the magnetic recording medium prepared by the coating method, using the hexagonal ferrite magnetic particulate. Accordingly, from the viewpoint of the reduction of noise during magnetic recording or regenerative output stage, it is desirable that hexagonal ferrite magnetic particulate has a particulate size of as small as possible.

In the preparation of the hexagonal ferrite magnetic particulate by the above-mentioned conventional vitrification process, it is possible to reduce the size of the resulting ferrite magnetic particulate by employing a relatively low temperature for the heat treatment in the process of the production and deposition of the hexagonal ferrite crystals in the amorphous material. However, if the size of ferrite magnetic particulate is reduced by performing the heat-treatment at a low temperature, the magnetic characteristics, in particular the saturation magnetization, seriously decreases. That is, in the conventional vitirificatin process, the lower the heat-treatment temperature on the amorphous material becomes, the smaller the size of the resulting ferrite magnetic particulate becomes, and accordingly the lower the saturation magnetization of ferrite magnetic particulate becomes. The extent of reduction of the saturation magnetization owing to the reduction in the particulate size is surprisingly great. Therefore, there is a great need for the process for preparing the ferrite magnetic particulate with higher saturation magnetization than that obtained by the conventional vitrification process, when compared at the same particulate size level. In other words, a process for the preparation of the hexagonal ferrite magnetic particulate which gives a ferrite magnetic particulate with smaller size than that obtained by the conventional vitrification on the equal saturation magnetization basis is desired.

SUMMARY OF THE INVENTION

The present inventor has made study to provide an improved process to solve the problem in the process for the preparation of the hexagonal ferrite magnetic particulate for magnetic recording utilizing the conventional vitrification process. As a result, the inventor has discovered that a ferrite magnetic particulate with higher saturation magnetization than that obtained by the conventional vitrification process, the comparison being on the same particulate size basis, is obtainable by substituting a portion of boron oxide ($B_2O_3$) used as a vitrification component in the conventional process with silicon dioxide ($SiO_2$). In other words, it has been discovered that a ferrite magnetic particulate with smaller size than that obtained by the conventional vitrification when compared on the equal saturation magnetization basis is obtainable.

Accordingly, the present invention provides a process for the preparation of a ferrite magnetic particulate for magnetic recording which comprises steps of:

(1) melting a starting material mixture containing a basic component for hexagonal ferrite, a coercive force-reducing component and a glass-forming component, (2) rapidly cooling the resulting molten mixture to obtain an amorphous material, (3) heat-treating said amorphous material to form ferrite crystals, and (4) removing components other than the ferrite crystals from the material resulting from said heat-treatment;

characterized in that said starting material mixture contains a glass-forming component comprising a $B_2O_3$ component and a $SiO_2$ component in which the amount of said $SiO_2$ component has a value in terms of $SiO_2$ to 0.05 to 0.8 (value represented by a molar ratio of $SiO_2/(B_2O_3+SiO_2)$.

DETAILED DESCRIPTION OF THE INVENTION

The process of the present invention is characterized by the use of the specific components as the glass-forming component in the preparation of the hexagonal ferrite magnetic material for magnetic recording using the conventional vitrification process. Therefore, the basic component for the hexagonal ferrite, and the coercive force-reducing component can be arbitrarily chosen on the basis of the conventional arts.

In the preferred embodiment of the starting material mixture for the ferrite of the present invention, said mixture contains each component constituting said mixture in such an amount that the amounts of $B_2O_3+SiO_2$ is from 20 to 40 molar %, that of RO is from 25 to 50 molar %, that of $Fe_2O_3$ is from 20 to 50 molar %, that of MO is from 2 to 10 molar %, and that of $M'O_2$ is from 2 to 10 molar % wherein R is at least one metal atom selected from the group consisting of barium, strontium and lead, M is at least one divalent metal atom selected from the group consisting of cobalt, nickel and zinc, and M' is at least one tetravalent metal atom selected from the group consisting of titanium, zirconium and hafnium.

In the above description, each component is expressed as an oxide and the content thereof is expressed in terms of the oxide. However, each component may be used in the form of a compound or a salt capable of being converted into the above oxide under heating conditions in the first step (the step of melting the starting material mixture). For instance, $B_2O_3$ may be introduced in the form of boric acid into the mixture, and other metallic components in the form of a compound having relatively low melting point such as carbonate or nitrate may be introduced into the mixture. More in detail, the term "$B_2O_3$ component" means to include $B_2O_3$ and compounds which are convertible to $B_2O_3$ under the heating condition in the first step. Also, the term "$SiO_2$ component" means to include $SiO_2$ itself and compounds which are convertible to $SiO_2$ under the heating condition in the first step.

The glass-forming component in the starting material mixture used in the present invention contains the $B_2O_3$ component and the $SiO_2$ component, in which the amount of the $SiO_2$ component ranges from 0.05 to 0.8 (preferably from 0.1 to 0.5) in the molar ratio of $SiO_2/(B_2O_3+SiO_2)$. In the combination of $B_2O_3$ component and $SiO_2$ component, if the amount of the $SiO_2$ exceeds the above-mentioned range, there arises a problem that the glass component is difficultly removed in the subsequent glass component-removing process (etching process) with a weak acid which is carried out after the precipitation of ferrite crystals. In addition, the heat-treatment at a higher temperature is required for the crystallization and deposition of ferrite. If the amount of the $SiO_2$ component is lower than the above-mentioned range, the function of the $SiO_2$ component expected as the glass-forming component is poorly shown.

The proportion of the glass-forming component comprising the combination of $B_2O_3$ component and $SiO_2$ component in the weight in the ferrite starting material mixture may be optionally selected fundamentally based on the prior arts. The preferable range for the glass-forming component of the invention is that the amount of $B_2O_3+SiO_2$ ranges 20 to 40 molar % in the total starting material mixture in terms of oxide. If the amount of $B_2O_3 + SiO_2$ is less than 20 molar %, the mixture is difficultly melted, and even if the mixture is melted, a satisfactory amorphous material is hardly obtained on quenching because the crystallization takes place too fast. If the amount of $B_2O_3 + SiO_2$ is more than 40 molar %, other crystals than aimed hexagonal ferrite tend to deposit.

The process for the preparation of the ferrite magnetic particulate for magnetic recording using the starting material mixture of the present invention is further described hereinbelow.

Each of the starting material components are thoroughly mixed together to obtain a starting material mixture for ferrite. The mixture is melted by heating it to a vicinity of the melting temperature, for example, at a temperature of from 1250° to 1400° C., and quenched to form an amorphous material.

The so-obtained amorphous material is heat-treated to form and deposit hexagonal ferrite crystals therefrom, and components such as glass component, etc. other than the ferrite crystals are removed from the heat-treated material by utilizing a treating technique such as etching treatment with an acid to obtain fine ferrite crystal powder.

The heat-treatment of the amorphous material to deposit the ferrite crystals is a conventional technique, and can be conducted, for example, by heating the amorphous material at a temperature of from 700° to 950° C.

The fine ferrite crystals obtained by conducting the above removal treatment of the glass component, etc. are subjected to a rinsing treatment and a drying treatment in a similar manner to that of conventional technique, whereby the desired magnetic material in the form of fine particle (ferrite magnetic material for magnetic recording) can be obtained.

The ferrite magnetic particulate for magnetic recording which is prepared according to the present invention using the $B_2O_3$ component and $SiO_2$ component as the glass-forming component, is obtained in the form of finer particulate than ferrite magnetic particulate prepared by the conventional method in which only $B_2O_3$ is used as the glass-forming component when compared on the equal saturation magnetization basis.

It is not entirely clear why the process of the present invention provides the ferrite magnetic particulate with especially finer size, but the reason is surmised as described hereinafter. In the first place, it is considered that a portion of nuclei of ferrite crystals is produced even in the step for quenching the molten material to form amorphous material. In the case that $SiO_2$ is introduced into the starting material mixture, the viscosity of the molten mixture increases, and the production of nuclei is effectively depressed. Thus, smaller nuclei are produced. In the second place, $SiO_2$ is more thermally stable than $B_2O_3$, and accordingly it is considered that $SiO_2$ exhibits the depressing effect on the growth of ferrite crystals also in the heat-treatment step for the amorphous material. The ferrite crystals obtainable according to the present invention have well defined crystal configuration, that is, the present invention provides an advantage that the corners of individual crystals are formed sharp. It is surmised that this fact is also caused by viscosity increase of the glassy molten material, that is, by the properly depressed rate of growth of crystals.

The ferrite magnetic particulate obtainable according to the present invention has finer size than that obtained according to the conventional process, when compared on an equal saturation magnetization basis. For this reason, the magnetic recording medium produced using the ferrite magnetic particulate obtained by the present invention shows lower noise during magnetic recording and regenerative output stages than the medium produced using a ferrite magnetic particulate obtained by the conventional process does.

In addition, the ferrite magnetic particulate for magnetic recording obtainable by the present invention has ferrite crystals with well defined configuration as mentioned hereinbefore. Consequently, a magnetic recording medium produced using this magnetic particulate is excellent in the perpendicular orientation of magnetic particulate, and exhibits an improved magnetic recording performance.

From the above-mentioned reasons, the ferrite magnetic particulate for magnetic recording obtained by the present invention is especially satisfactory as magnetic particulate for magnetic recording medium based on the perpendicular magnetic recording system.

The present invention will be further illustrated by the following examples.

EXAMPLES 1-2 & COMPARISON EXAMPLES 1-3

The $SiO_2$-$B_2O_3$-$BaO$-$Fe_2O_3$-$CoO$-$TiO_2$ combination was selected as a starting material combination for the preparation of hexagonal barium ferrite crystals by vitrification process. Each component was so weighed and mixed that the contents of these components corresponded to values shown in Table 1 (in terms of molar %).

TABLE 1

|  | Com. Example 1-3 | Example 1 | Example 2 |
|---|---|---|---|
| $SiO_2$ | 0 | 3 | 10 |
| $B_2O_3$ | 27 | 24 | 17 |
| BaO | 35 | 35 | 35 |
| $Fe_2O_3$ | 29 | 29 | 29 |
| CoO | 4.5 | 4.5 | 4.5 |
| $TiO_2$ | 4.5 | 4.5 | 4.5 |
| Total | 100 | 100 | 100 |

The starting material mixture was put in a platinum crucible, and the mixture was heated and melted at the temperature of 1300°–1350° C. in a furnace of silicon carbide heater under stirring. Subsequently, the molten material was poured onto a pair of rolls of stainless steel from an orifice utilizing the air pressure so that the molten material was brought into contact with the surface of the roll for cooling. Thus, flaky amorphous material was obtained.

In Examples 1 to 2 and Comparison Example 1 ferrite crystals were produced and deposited by the heat-treatment comprising the following steps: the amorphous material was placed in a heat-treatment furnace; and the furnace was heated to 500° C. at a rate of 120° C./hr and maintained at the temperature for 6 hours (for production of nuclei), heated again to 800° C. at a rate of 120° C./hr, and maintained at the temperature 8 hours (for production of crystals), subsequently cooled to room temperature at a rate of 120° C./hr. In Comparison Example 2 to 3, the heat-treatment was carried out in the same manner as described above except that the temperatures for depositing crystals were prescribed at 770° C. and 750° C., respectively.

The heat-treated material was subjected to etching treatment in which the material was treated with acetic acid (35 vol %) at 90° C. for 4 hours (treatment for removing glass component), and washed with water and vacuum dried to obtain barium ferrite crystal particulate (barium ferrite magnetic particulate). Thus obtained barium ferrite crystals were hexagonal ferrite crystals represented by the formula: ($BaFe_{10.4}Co_{0.8}Ti_{0.8}O_{19}$).

The coercive force (Hc), saturation magnetization, particulate size ($\mu$m), and specific surface area of the barium ferrite magnetic particulates were measured. The results are set forth in Table 2.

TABLE 2

| | Coercive Force (Hc) (Oe) | Saturation Magnetization (emu/g) | Specific Surface Area ($m^2/g$) | Particulate Size ($\mu$m) |
|---|---|---|---|---|
| Example: | | | | |
| 1 | 900 | 55.8 | 26.8 | 0.07 |
| 2 | 940 | 55.5 | 36.3 | 0.06 |
| Com. Example | | | | |
| 1 | 870 | 55.4 | 17.8 | 0.1 |
| 2 | 980 | 53.0 | 27.4 | 0.07 |
| 3 | 1030 | 50.1 | 34.5 | 0.06 |

The specific surface area was measured by BET method.

I claim:

1. A process for the preparation of a hexagonal ferrite magnetic particulate for magnetic recording having the formula $RFe_{12-2x}M_xM^1_xO_{19}$ wherein R is at least one metal atom selected from the group consisting of barium, strontium and lead, M is at least one divalent metal atom selected from the group consisting of cobalt, nickel and zinc, $M^1$ is at least one tetravalent metal atom selected from the group consisting of titanium, zirconium and hafnium, and x is a number from 0.6 to 1.0 which comprises steps of:

(1) melting a starting material mixture containing basic components for said hexagonal ferrite, and a glass-forming component, (2) rapidly cooling the resulting molten mixture to obtain an amorphous material, (3) heat-treating said amorphous material to form ferrite crystals, and (4) removing components other than the ferrite crystals from the materials resulting from said heat-treatment;

characterized in that said starting material mixture contains a glass-forming component comprising a $B_2O_3$ component and a $SiO_2$ component in which the molar ratio of $SiO_2/(B_2O_3+SiO_2)$ is, 0.05 to 0.8, said ferrite having a higher saturation magnetization than the ferrite of the same particle size prepared as above absent the $SiO_2$ component.

2. The process for the preparation of a ferrite magnetic particulate as claimed in claim 1, wherein said starting material mixture contains each component constituting said mixture in such an amount in terms of the oxide that the amount of $B_2O_3+SiO_2$ is from 20 to 40 molar %, that of RO is from 25 to 50 molar %, that of $Fe_2O_3$ is from 20 to 50 molar %, that of MO is from 2 to 10 molar %, and that of $M'O_2$ is from 2 to 10 molar %.

3. The process for the preparation of a ferrite magnetic particulate as claimed in claim 1, wherein the molar ratio of $SiO_2/(B_2O_3+SiO_2)$ is within a range of from 0.1 to 0.5.

* * * * *